(12) United States Patent
Fluckiger et al.

(10) Patent No.: US 6,246,008 B1
(45) Date of Patent: *Jun. 12, 2001

(54) PROCESS FOR PRODUCING A CORE WIRE FOR WELDING ELECTRODES AND AN ELECTRODE CORE WIRE

(75) Inventors: Jean-Louis Fluckiger, Sao Paulo (BR); Johann Wabnegger, St. Sulpice (CH)

(73) Assignee: Castolin, S.A., Sulpice (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,274
(22) PCT Filed: Jun. 15, 1996
(86) PCT No.: PCT/EP96/02589
§ 371 Date: Apr. 13, 1998
§ 102(e) Date: Apr. 13, 1998
(87) PCT Pub. No.: WO97/01413
PCT Pub. Date: Jan. 16, 1997

(30) Foreign Application Priority Data

Jun. 28, 1995 (DE) .............................. 195 23 400

(51) Int. Cl.[7] .................................................. H01B 5/00
(52) U.S. Cl. ..................................... 174/126.1; 174/126.2
(58) Field of Search .............................. 174/94 R, 126.2, 174/126.1; 439/887; 219/56.1, 56.21; 228/4.5

(56) References Cited

U.S. PATENT DOCUMENTS

| | | | |
|---|---|---|---|
| 2,750,658 | * | 6/1956 | Went et al. ........................ 29/191.2 |
| 2,785,285 | * | 3/1957 | Bernard ............................... 219/146 |
| 3,691,340 | * | 9/1972 | Landis et al. ....................... 219/146 |
| 3,909,581 | * | 9/1975 | Stone et al. ......................... 219/120 |
| 3,999,036 | * | 12/1976 | Muratov et al. .................... 219/145 |
| 4,044,220 | * | 8/1977 | Glagola .............................. 219/119 |
| 4,355,224 | * | 10/1982 | Mesick et al. ............... 219/137 WM |
| 4,800,131 | * | 1/1989 | Marshall et al. ..................... 428/558 |
| 4,999,336 | * | 3/1991 | Nadkarni et al. ..................... 505/1 |
| 5,015,816 | * | 5/1991 | Bush et al. .......................... 219/119 |
| 5,111,002 | * | 5/1992 | Hollander ....................... 174/102 P |
| 5,364,442 | * | 11/1994 | Sekhar ................................ 75/229 |
| 5,584,975 | * | 12/1996 | Pohto et al. ........................ 204/228 |
| 5,753,880 | * | 5/1998 | Iwasa et al. ........................ 219/118 |

FOREIGN PATENT DOCUMENTS

| | | |
|---|---|---|
| 2244304 | 3/1973 | (DE) . |
| 0015746 | 9/1980 | (EP) . |
| 2158621 | 6/1973 | (FR) . |
| 246140 | 4/1926 | (GB) . |
| WO86/03716 | 7/1986 | (WO) . |

OTHER PUBLICATIONS

Belgian Patent 777588 published Apr. 17, 1972.

* cited by examiner

Primary Examiner—Dean A. Reichard
Assistant Examiner—William H. Mayo, III
(74) Attorney, Agent, or Firm—Bachman & LaPointe, P.C.

(57) ABSTRACT

A process for producing a core wire includes the steps of providing a core includes a metal material enclosed in an inner sheathing which is further enclosed in an outer sheathing wherein the core is a metal alloy selected from the group consisting of alloys of iron, nickel, cobalt, copper aluminum and mixtures thereof.

8 Claims, 2 Drawing Sheets

PROCESS FOR PRODUCING A CORE WIRE FOR WELDING ELECTRODES AND AN ELECTRODE CORE WIRE

BACKGROUND OF THE INVENTION

The invention concerns a process for producing a core wire for welding electrodes based on iron, nickel, cobalt, copper and/or aluminum. The invention also concerns such an electrode core wire.

The use of solid and filler wires which are available on the market as core wires for the production of welding electrodes gives rise to problems in regard to the rise in temperature of the electrode in the welding operation, which in many cases becomes red-hot. In the case of electrodes which are produced from filler wire, deficiencies occur due to the thin sheathing, while in addition in this case also a substantial increase in temperature and destabilization of the arc in the welding operation is to be noted.

If electrodes involving a complex alloy composition are to be produced, non-standardized core wires are very rarely to be found on the market, with the consequence that it is scarcely possible to obtain them, in particular when small delivery amounts are involved.

As a reduction in manufacturing costs would be a major market advantage when producing core wire products, the inventor set himself the task of improving the a process from a cost and quality standpoint.

SUMMARY OF THE INVENTION

In endeavours to find a method of matching the chemical analysis of a core wire relatively easily and without difficulties, even for small production quantities, the solution to the problem was found in accordance with the process for producing a core wire for welding electrodes comprising the steps of providing a core of an alloy selected from the group consisting of alloys of iron, nickel, cobalt, copper, aluminum and mixtures thereof; providing an inner sheathing around the core; and providing an outer sheathing around the inner casing.

In the process according to the invention for producing a core wire for welding electrodes based on iron, nickel, cobalt, copper and/or aluminum, a filler or solid wire of the same or different chemical composition as the core wire is sheathed at least once. For that purpose it has been found desirable that two or more metal strips lying one upon the other afford a market in terms of cost expenditure or sale for such products, the inventor set himself the aim of improving the process and a core wire of the kind set forth in the opening part of this specification.

It is also in accordance with the invention for at least one metal strip to be shaped to form a channel-like blank of part-circular cross-section and for a filler wire or a metal wire to be laid therein, whereafter the blank is closed in respect of its cross-section. The surfaces of the wires and/or strips forming the core wire are in accordance with the invention also to be subsequently treated thermally or chemically.

In accordance with a feature of the invention the core wire has a core which is sheathed a plurality of times. That core wire can be a filler wire which is sheathed at least once or a sheathed core comprising a powder or a solid wire which is sheathed at least once.

In regard to the choice of the alloys for the sheathing and the casing of the filler wire reference is made to claims 9 to 24.

It may be advantageous for both the sheathing and also the inserted solid wire to comprise an iron alloy, a nickel alloy or a copper alloy. Further configurations are to be found in claims 26, 28 and 30.

Improvements are also achieved by the step of selecting the outside diameter of the core wire which is produced in accordance with the process, at between 1.6 and 6.0 mm. A strip for the outer casing of the core wire is to be of a strip thickness of 0.1 to 0.8 mm, preferably 0.2 to 0.5 mm, and/or a strip for producing the inserted filler wire is to be of a strip thickness of 0.2 to 0.5 mm. The ratio between the wall thickness of the outer casing and the thickness of the inner casing is preferably selected at between 1:1 and 1:2.

In accordance with the invention the filling of the filler wire is to contain hard substances such as borides, carbides, nitrides and silicides and/or as deoxidizers elements such as silicon, manganese or the like. Oxides, silicates, carbonates or the like can be included in the filling of the filler wire as arc stabilizers.

BRIEF DESCRIPTION OF THE DRAWINGS

Further advantages, features and details of the invention will be apparent from the following description of preferred embodiments and with reference to the drawing in which.

DETAILED DESCRIPTION OF THE INVENTION

Figure 1:
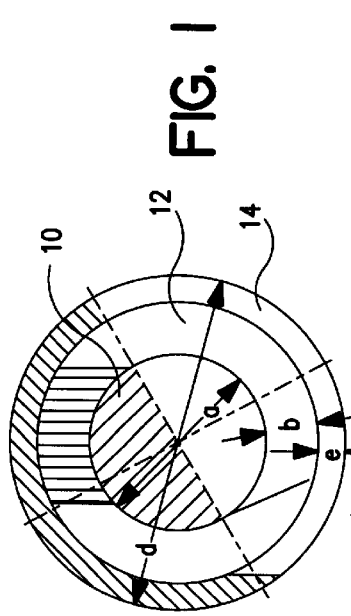
FIG. 1 is a view in cross-section through a double-casing electrode core wire.

Referring to FIG. 1 a double-casing filler wire F of a diameter d which is shown on an exaggerated scale comprises an inserted filling core 10 of a diameter a, an inner casing 12 of a thickness b which surrounds the filling core 10 and an outer casing 14 of a smaller thickness e in relation thereto, which is disposed around the inner casing 12.

Figure 2:
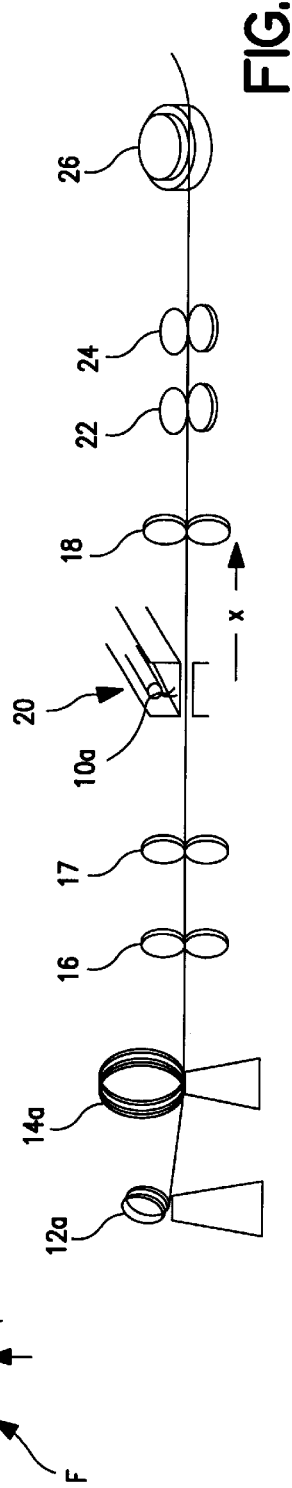
FIGS. 2 and 4 show flow charts relating to production processes.

In the production process indicated in FIG. 2 two metal strips $12_a$ and $14_a$ which produce the inner casing 12 and the outer casing 14 respectively, are fed to a first pair of bending rollers 16 and, downstream of a further pair of bending rollers 17, passed through a filling station 20 in which powder $10_a$ for the filling core 10 is introduced.

Figure 3:
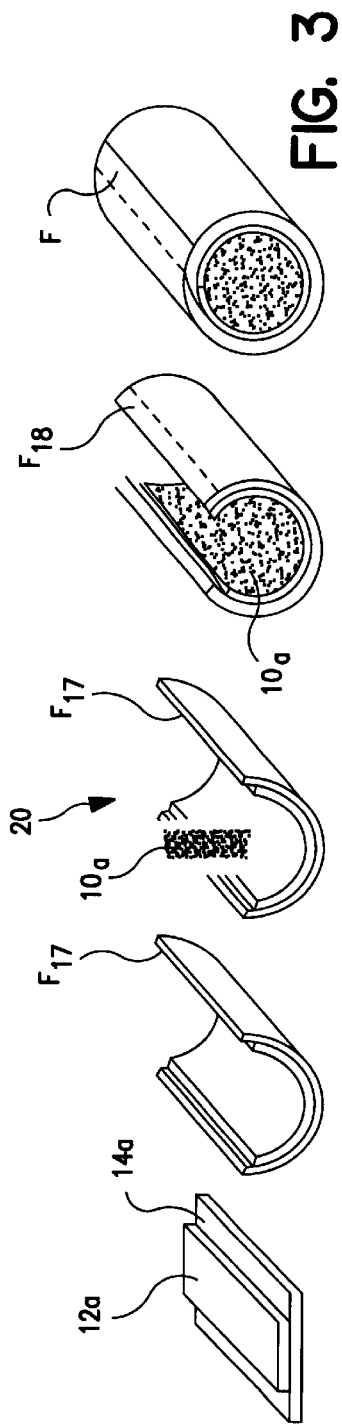
FIG. 3 is a diagrammatic view showing five stages for providing the double-casing electrode core wire as shown in FIG. 1 in one working operation.

Looking at FIG. 3, shown beside a diagrammatic view which can be seen at the left illustrating the two metal strips $12_a$, $14_a$ which lie flat one upon the other is a gutter or channel $F_{17}$ as a shaped blank downstream of the second pair of bending rollers 17, while to the right thereof FIG. 3 shows the operation of shaking the powder $10_a$ into the channel $F_{17}$.

The filling station 20 is followed in the conveying direction x by a further pair of bending rollers 18; the corresponding blank shape with powder inlay $10_a$ is identified at $F_{18}$ in FIG. 3. Two pairs of closing rollers 22, 24 close the double-casing filler wire F and transfer it to a winding-on drum 26.

Figure 4:
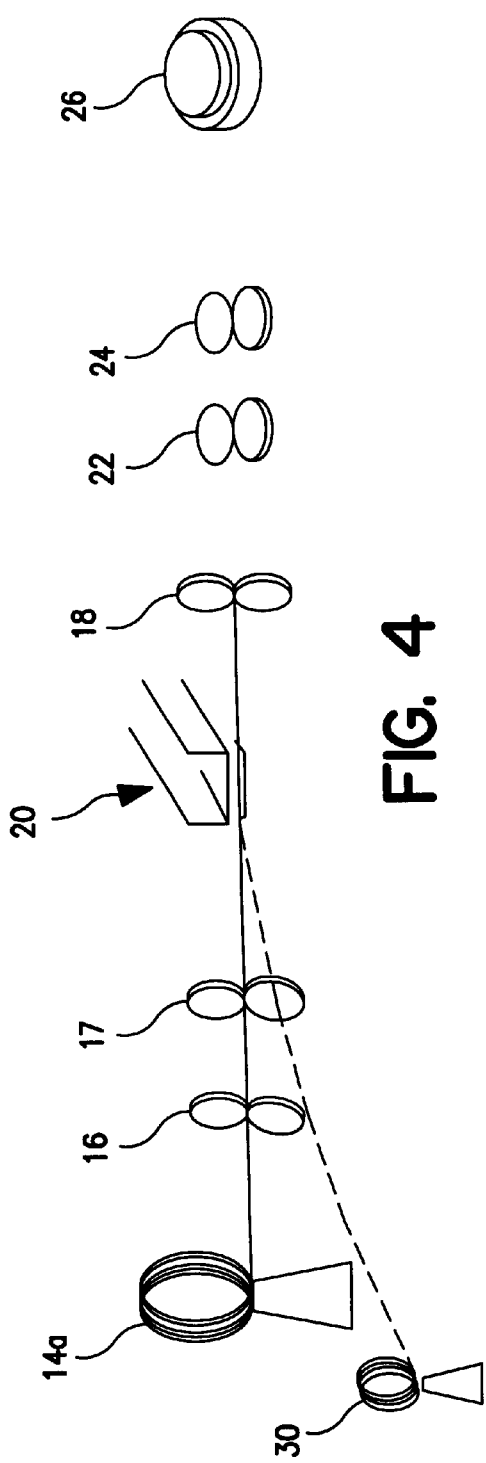
Figure 5:
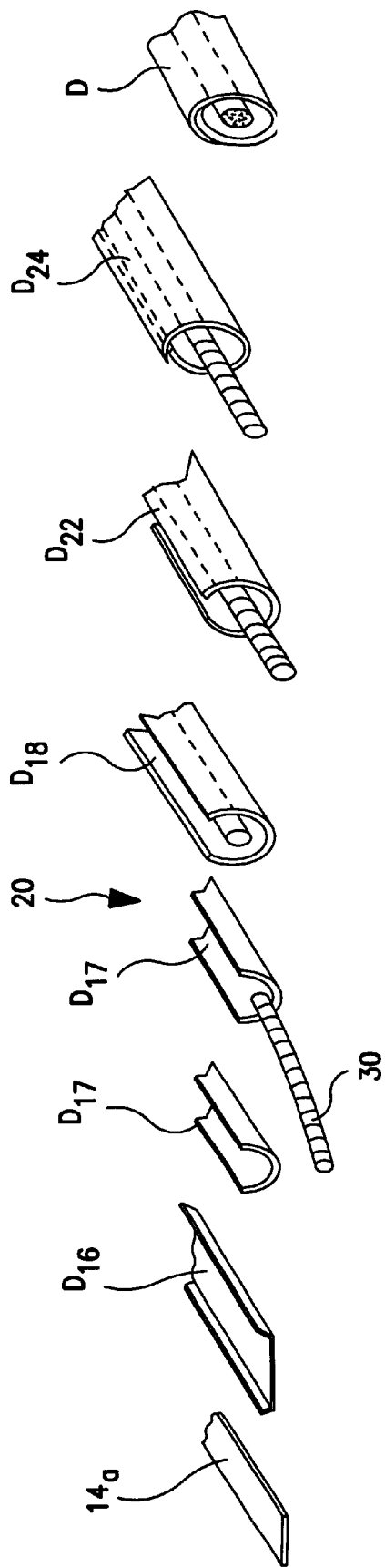
FIG. 5 is a diagrammatic view with five stages for providing another electrode core wire.

The production of another casing-type filler wire D can be seen from FIGS. 4 and 5; therein an outer metal strip $14_a$ passes on its own through the two pairs of bending rollers 16, 17; FIG. 5 illustrates shaping of the metal strip $14_a$ to form the flat channel $D_{16}$ and then the round channel $D_{17}$. At the filling station 20, a laterally applied filler wire 30 is displaced in the conveying direction x into the round channel $D_{16}$ which is increasingly closed between the bending rollers 18 and then in the pairs of closing rollers 22, 24 (blanks $D_{22}$, $D_{24}$). The finished casing-type filler wire D then passes to the winding-on drum 26.

In this case therefore the filler wire 30 which is matched in accordance with conventional processes in terms of chemical composition is sheathed with the additional metal strip $14_a$.

The composition of the metal strip $14_a$ may correspond to the casing of the inserted filler wire 30 or it may be of a different composition to produce a welding bath analysis.

A further possible way of producing pseudo-alloys is that, in accordance with the above-described process, a solid wire—instead of the filler wire 30—is provided with one or more jackets and in that way compositions are to be produced which cannot be manufactured in accordance with the normal operating procedures such as melting and shaping.

Core wires which are produced in that way can then be used to produce double-casing electrodes or bar electrodes with single encasement, which are encased in conventional manner.

What is claimed is:

1. A process for producing a core wire for welding electrodes comprising the steps of:
   (a) providing a core of an alloy selected from the group consisting of alloys of iron, nickel, cobalt, copper, aluminum, and mixtures thereof;
   (b) providing a first metal strip to form an outer sheathing;
   (c) providing a second metal strip to form an inner sheathing;
   (d) locating the second metal strip on the first metal strip;
   (e) shaping the first metal strip and the second metal strip simultaneously to form a circular channel;
   (f) positioning the core in said circular channel; and;
   (g) further shaping the first metal strip whereby said second metal strip encloses said core and said first metal strip encloses said second metal strip to form the inner sheathing and the outer sheathing.

2. An electrode core wire produced by the process of claim 1.

3. An electrode core wire according to claim 2 wherein said core is formed of powdered metal.

4. An electrode core wire according to claim 2 wherein said core is solid metal wire.

5. A process according to claim 1 wherein said first metal strip has a width $W_1$ and said second metal strip has a width $W_2$ wherein $W_2<W_1$.

6. A process for producing a core wire for welding electrodes comprising the steps of:
   (a) providing a core of powdered metal surrounded by an inner sheathing, said powdered metal being formed of an alloy selected from the group consisting of alloys of iron, nickel, cobalt, copper, aluminum and mixtures thereof;
   (b) providing a metal strip to form an outer sheathing;
   (c) first shaping the metal strip to form a flat channel;
   (d) further shaping the flat channel to form a part circular channel;
   (e) positioning said core with inner sheathing in said part circular channel; and
   (f) closing the part circular channel to encase the core thereby forming an outer sheathing to produce the core wire.

7. An electrode core wire produced by the process of claim 6.

8. An electrode core wire according to claim 6 wherein said core is solid metal wire.

* * * * *

UNITED STATES PATENT AND TRADEMARK OFFICE
CERTIFICATE OF CORRECTION

PATENT NO. : 6,246,008 B1  
DATED : June 12, 2001  
INVENTOR(S) : Jean-Louis Fluckiger et al.

Page 1 of 1

It is certified that error appears in the above-identified patent and that said Letters Patent is hereby corrected as shown below:

ABSTRACT,
Line 2, between "core" and "includes", insert -- which --.

Column 4, claim 6,
Paragraph (f), before "thereby", the following should be inserted, -- and said inner sheathing --.

Signed and Sealed this

Fourth Day of December, 2001

*Attest:*

NICHOLAS P. GODICI
*Attesting Officer*     *Acting Director of the United States Patent and Trademark Office*